US012366511B2

(12) United States Patent
Kanno et al.

(10) Patent No.: US 12,366,511 B2
(45) Date of Patent: Jul. 22, 2025

(54) MOISTURE METER, STATE DIAGNOSIS METHOD FOR MOISTURE METER, AND STORAGE MEDIUM

(71) Applicant: A&D COMPANY, LIMITED, Tokyo (JP)

(72) Inventors: Masahiro Kanno, Saitama (JP); Yoshikazu Nagane, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 138 days.

(21) Appl. No.: 17/792,080

(22) PCT Filed: Jan. 16, 2020

(86) PCT No.: PCT/JP2020/001283
§ 371 (c)(1),
(2) Date: Jul. 11, 2022

(87) PCT Pub. No.: WO2021/144920
PCT Pub. Date: Jul. 22, 2021

(65) Prior Publication Data
US 2023/0059297 A1 Feb. 23, 2023

(51) Int. Cl.
*G01N 5/04* (2006.01)
(52) U.S. Cl.
CPC .................................. *G01N 5/045* (2013.01)
(58) Field of Classification Search
CPC ...................................................... G01N 5/045
(Continued)

(56) References Cited

U.S. PATENT DOCUMENTS

2002/0164814 A1 11/2002 Troxler
2005/0049800 A1* 3/2005 Izumo .................... G05D 22/02
702/31
(Continued)

FOREIGN PATENT DOCUMENTS

CN 108548748 A 9/2018
EP 0344465 A2 * 12/1989
(Continued)

OTHER PUBLICATIONS

International Search Report and Written Opinion issued in the corresponding Application No. PCT/JP2020/001283 issued on Mar. 31, 2020; 3 pages.
(Continued)

*Primary Examiner* — Marrit Eyassu
(74) *Attorney, Agent, or Firm* — Studebaker Brackett PLLC

(57) ABSTRACT

Provided is a moisture meter includes a mass scale for measuring a mass of a specimen, a heater for heat the specimen, a processor causes the moisture meter to control the heater to heat the specimen until a change in mass of the specimen becomes not more than a predetermined threshold and calculate a moisture content of the specimen, and a storage unit. The processor causes the moisture meter to execute a measurement of a moisture content a plurality of times by using, as the specimen, a standard substance for inspection having a predetermined theoretical moisture content with an arbitrary mass when being heated at a predetermined temperature, to calculate a standard deviation of a measured moisture content in the measurement executed the plurality of times, and a to evaluate an influence of an installation environment by determining whether the standard deviation is not more than a predetermined value.

6 Claims, 7 Drawing Sheets

(58) Field of Classification Search
USPC .................................................. 73/73, 76
See application file for complete search history.

(56) References Cited

U.S. PATENT DOCUMENTS

| | | | |
|---|---|---|---|
| 2010/0086004 A1 | 4/2010 | Dellar et al. | |
| 2012/0060593 A1* | 3/2012 | Steinrisser | G01N 5/045 73/73 |
| 2013/0306382 A1* | 11/2013 | Izumo | G01G 23/48 177/25.14 |

FOREIGN PATENT DOCUMENTS

| IN | 109596452 A | 4/2019 |
|---|---|---|
| JP | 62-839 A | 1/1987 |
| JP | 05-050345 U | 7/1993 |
| JP | 5-50345 U1 | 7/1993 |
| JP | 2003-344255 A | 12/2003 |
| JP | 3993466 B2 * | 10/2007 |
| JP | 2015-045663 A | 3/2015 |
| WO | 2019/165865 A1 | 9/2019 |

OTHER PUBLICATIONS

Reply to International Search Report and Written Opinion under PCT Article 34 filed in the corresponding Application No. PCT/JP2020/001283 on May 11, 2021; 3 pages (English translation to follow).
International Preliminary Report on Patentability issued in the corresponding Application No. PCT/JP2020/001283 on Jun. 15, 2021; 6 pages.
Reply to International Search Report and Written Opinion under PCT Article 34 filed in the corresponding Application No. PCT/JP2020/001283 on May 11, 2021; 4 pages (English translation).
Anonymous, "Moisture Meter Calibration Regulations", product website, Guangzhou Shenhua Biotechnology Co., Ltd., https://www.zhyico.com/news_jsview.asp?id=7091, Sep. 30, 2019, whole document.

* cited by examiner

MOISTURE METER, STATE DIAGNOSIS METHOD FOR MOISTURE METER, AND STORAGE MEDIUM

TECHNICAL FIELD

The present invention relates to a moisture meter and, more particularly, to a heat-drying moisture meter.

BACKGROUND ART

Conventionally, a heat-drying moisture meter is known as one of the devices that measure the moisture of a specimen (for example, Patent Literature 1). The heat-drying moisture meter evaporates the moisture in a specimen by heating the specimen to measure the moisture content of the specimen from a change (decrease) in the mass of the specimen before and after heating. Hereinafter, in this description, a moisture meter means a heat-drying moisture meter unless otherwise specified.

Patent Literature 1 discloses a moisture meter configured to perform calibration by using a substance whose moisture content is known in advance, such as sodium tartrate dihydrate ($C_4H_4Na_2O_6 \cdot 2H_2O$, hereinafter simply referred to as "sodium tartrate"), as a standard substance for device performance inspection. Sodium tartrate is known to undergo an irreversible crystalline change to release moisture when being heated at a temperature of about 160° C. for about 10 min.

The moisture meter disclosed in Patent Literature 1 compares the measured moisture content of a standard substance with the theoretical moisture content of the standard substance stored in advance in a storage unit and evaluates the state of the moisture meter based on the comparison result in accordance with a preset evaluation criterion.

It is known that in the field of weighing devices (especially electronic balances), weighed values vary due to so-called disturbances such as abrupt temperature changes due to the operation of an air conditioner, changes in atmospheric pressure and humidity due to the passage of a low-pressure system, and the influence of an installation environment such as the occurrence of earthquakes in a remote location. Patent Literature 2 discloses a weighing device that weighs a known load a plurality of times to calculate variation (standard deviation) in weighed values and allows the user to recognize the state of the device.

CITATION LIST

Patent Literature

Patent Literature 1: Japanese Published Unexamined Patent Application No. 2003-344255
Patent Literature 2: Japanese Published Unexamined Patent Application No. 2012-154878

SUMMARY OF INVENTION

Technical Problem

However, for the moisture meter disclosed in Patent Literature 1, it is impossible to perform evaluation to determine whether the performance failure of the moisture meter is caused by the performance failure of the mass measurement unit itself or other factors, that is, the influence (disturbances) of the installation environment. On the other hand, using the standard deviation of weighed values for the evaluation of disturbances makes it necessary to weigh a known load a plurality of times as disclosed in Patent Literature 2. Therefore, there is a problem that the moisture meter needs to include a built-in weight capable of automatically moving up and down, resulting in complexity in the configuration of the moisture meter.

The present invention has been made in consideration of the above circumstances and has as its object to provide a heat-drying moisture meter that can diagnose the state of the device with a simple configuration in consideration of not only factors of a mass measurement unit itself but also factors other than the mass measurement unit itself.

Solution to Problem

In order to achieve the above object, a moisture meter according to one aspect of the present invention includes a mass measurement unit configured to measure a mass of a specimen placed on a weighing dish, a heating unit configured to heat the specimen, a control arithmetic unit configured to control the heating unit to heat the specimen until a change in mass of the specimen becomes not more than a predetermined threshold and calculate a moisture content of the specimen from the change in the mass of the specimen before and after heating, and a storage unit. The control arithmetic unit includes a standard substance measurement unit configured to execute a measurement of a moisture content a plurality of times by using, as the specimen, a standard substance for inspection having a predetermined theoretical moisture content with an arbitrary mass when being heated at a predetermined temperature, a standard deviation calculation unit configured to calculate a standard deviation of a measured moisture content in the measurement executed the plurality of times, and a state diagnosis unit configured to evaluate the presence/absence of an abnormality in the mass measurement unit by comparing the measured moisture content with a theoretical moisture content of the standard substance stored in the storage unit and evaluate an influence of an installation environment by determining whether the standard deviation is not more than a predetermined value.

In the above aspect, it is also preferable that the control arithmetic unit includes an average moisture content calculation unit configured to calculate an average moisture content by averaging measured moisture content in the measurement executed the plurality of times, and the state diagnosis unit evaluates the presence/absence of an abnormality in the mass measurement unit by comparing the average moisture content with the theoretical moisture content.

In the above aspect, the standard substance is also preferably a sodium tartrate dihydrate.

In the above aspect, it is also preferable that the moisture meter includes a display unit, and the state diagnosis unit displays, on the display unit, as diagnosis results, information indicating whether a cause of an abnormality has originated from the mass measurement unit or the installation environment and displays a message notifying a user of a countermeasure corresponding to the cause.

A state diagnosis method for a moisture meter according to another aspect of the present invention is a state diagnosis method for a moisture meter including a mass measurement unit configured to measure a mass of a specimen placed on a weighing dish, a heating unit configured to heat the specimen, a control arithmetic unit configured to control the heating unit to heat the specimen until a change in mass of the specimen becomes not more than a predetermined threshold and calculate a moisture content of the specimen from the change in the mass of the specimen before and after heating, and a storage unit. The method includes the steps of: (a) the control arithmetic unit executing a measurement of a moisture content a plurality of times by using, as the specimen, a standard substance for inspection having a predetermined theoretical moisture content with an arbitrary mass when being heated at a predetermined temperature, (b) the control arithmetic unit calculating a standard deviation of a measured moisture content in the measurement executed the plurality of times, (c) the control arithmetic unit evaluating the presence/absence of an abnormality in the mass measurement unit by comparing the measured moisture content with a theoretical moisture content of the standard substance stored in the storage unit, and (d) the control arithmetic unit evaluating an influence of an installation environment by determining whether the standard deviation is not more than a predetermined value.

A program according to another aspect of the present invention is a computer readable storage medium including a program for causing the moisture meter to execute the moisture meter state diagnosis method.

Benefit of Invention

A heat-drying moisture meter can diagnose the state of the device in consideration of not only factors of a mass measurement unit itself but also factors other than the mass measurement unit with a simple configuration.

BRIEF DESCRIPTION OF DRAWINGS

FIGS. 6A-6C-2 are views illustrating examples of a display of state diagnosis results in the inspection mode of the same moisture meter.

FIGS. 7A-7C-3 are views illustrating examples of a display of state diagnosis results in the inspection mode of the same moisture meter.

DESCRIPTION OF EMBODIMENT(S)

The preferred embodiment(s) of the present invention will be described below with reference to the accompanying drawings. However, the present invention is not limited to them.

EMBODIMENT(S)

Figure 1:
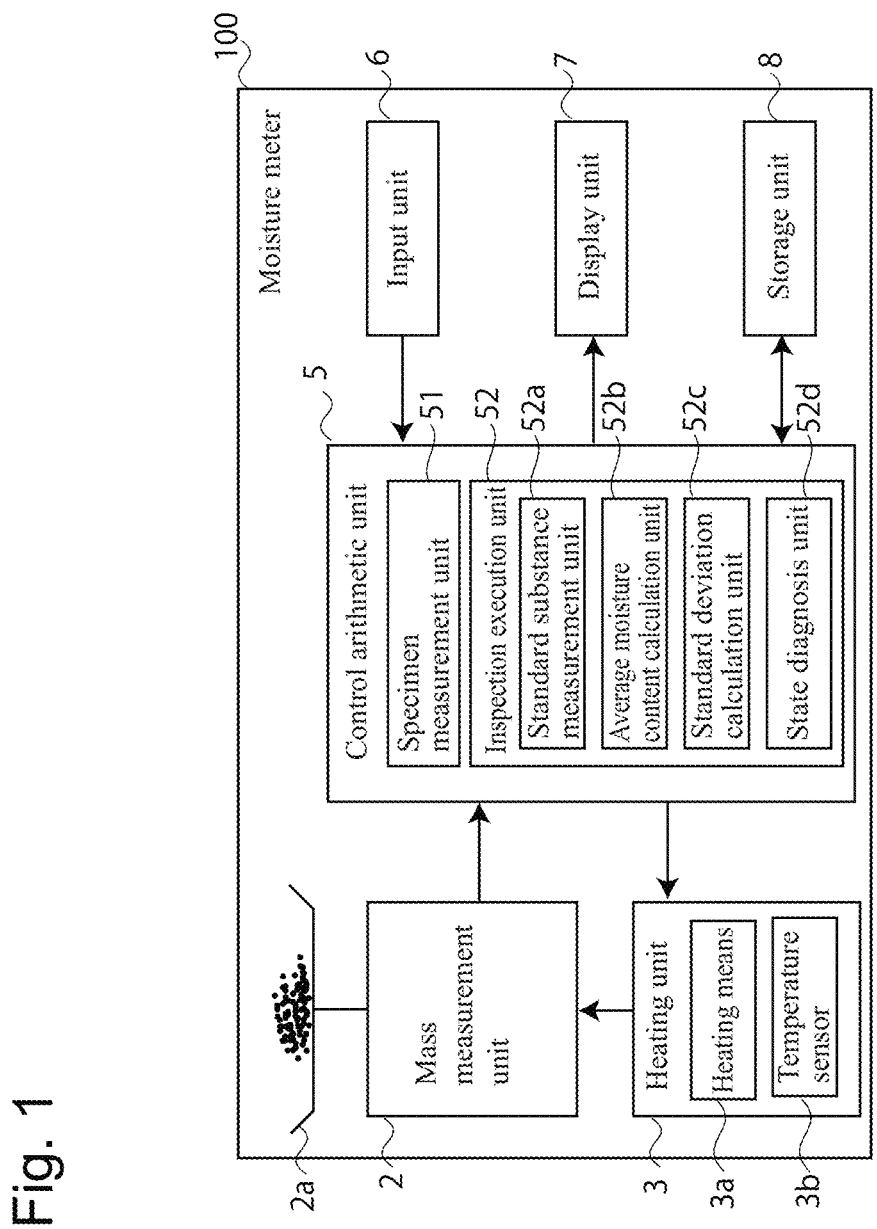
FIG. 1 is a block diagram illustrating the configuration of a moisture meter according to an embodiment of the present invention.
Figure 2:
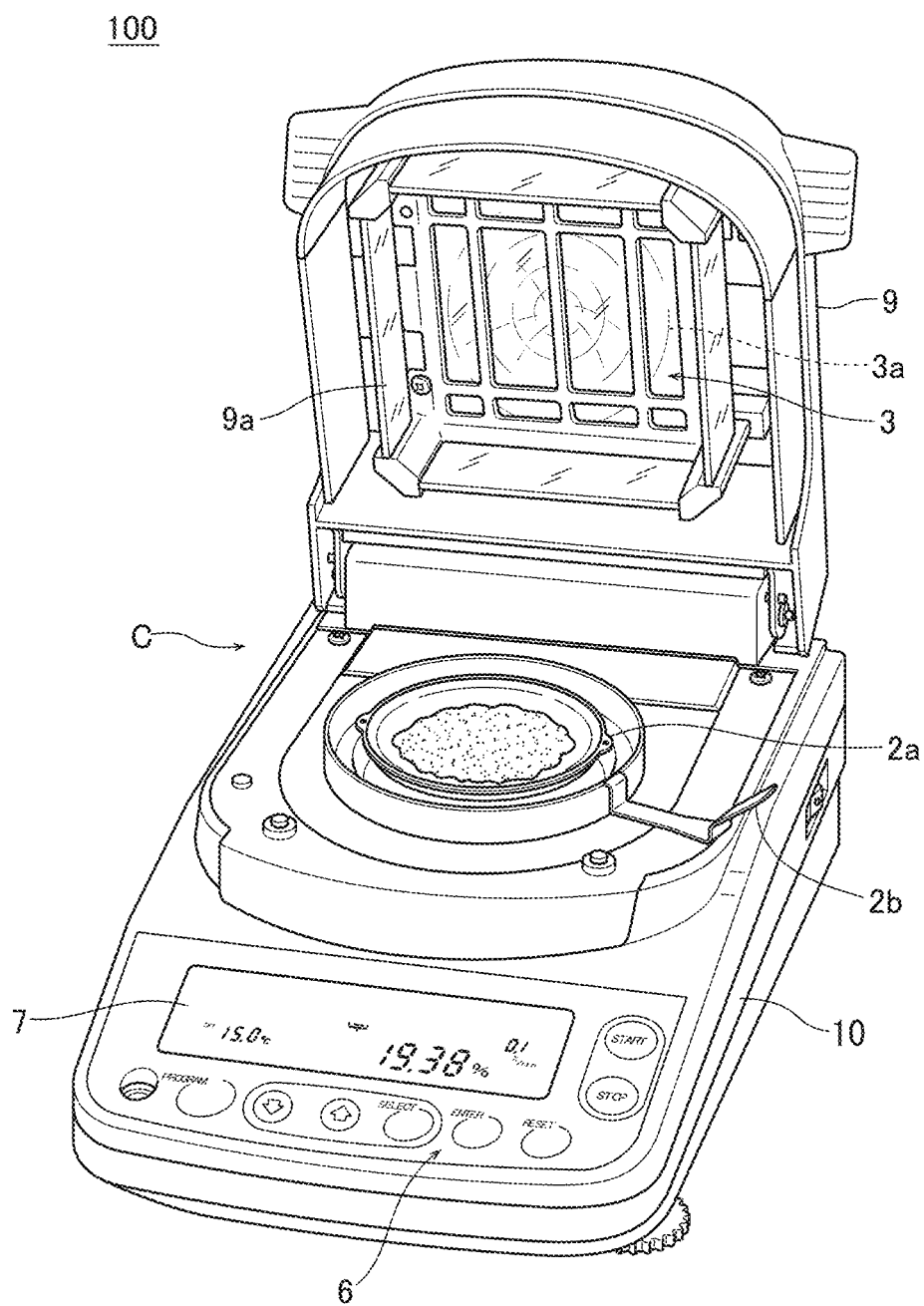
FIG. 2 is a perspective view illustrating a state in which the lid of the heating chamber of the same moisture meter is open.

FIG. 1 is a block diagram illustrating the configuration of a moisture meter 100 according to an embodiment of the present invention. FIG. 2 is a perspective view illustrating a state in which a lid 9 of a heating chamber C of the moisture meter 100 is open. As illustrated in FIG. 1, the moisture meter 100 includes a mass measurement unit 2, a heating unit 3, a control arithmetic unit 5, an input unit 6, a display unit 7, and a storage unit 8.

The mass measurement unit 2 is a so-called mass scale such as an electromagnetic balance mass sensor and is connected to a weighing dish 2a on which a specimen is placed. The mass measurement unit 2 measures the mass of the specimen placed on the weighing dish 2a. The mass measurement unit 2 is housed inside a moisture meter main body 10.

The weighing dish 2a is placed in the heating chamber C defined by closing the openable lid 9 illustrated in FIG. 2. The weighing dish 2a includes a knob 2b and is configured to be detachable with respect to the mass measurement unit 2. The heating chamber C is configured as a space defined by the upper portion of the moisture meter main body 10 and the lid 9 and houses the weighing dish 2a.

The heating unit 3 includes a heating means 3a such as a halogen lamp or a resistance wire that generates Joule heating and a temperature sensor 3b. The heating means 3a heats a specimen under the control of the control arithmetic unit 5 based on an output from the temperature sensor.

The heating means 3a is stored inside the lid 9 of the heating chamber C. The lid 9 includes a glass cover 9a in the form of a container covering the weighing dish 2a to prevent a specimen from coming into contact with the heating means 3a.

The control arithmetic unit 5 is a microcomputer including a CPU (Central Processing Unit) that performs arithmetic processing and a ROM (Read Only Memory) and a RAM (Random Access Memory).

The control arithmetic unit 5 is connected to the respective units, namely, the mass measurement unit 2, the heating unit 3, the input unit 6, the display unit 7, and the storage unit 8 and executes various operations for implementing the functions of the moisture meter 100.

The control arithmetic unit 5 controls the respective units to execute measurement in the specimen measurement mode and the inspection mode. The specimen measurement mode is a normal usage mode of the moisture meter 100, in which the moisture meter 100 measures the moisture content M of a specimen whose moisture content M is to be known. The inspection mode is a mode of inspecting the state of the moisture meter 100.

The control arithmetic unit 5 includes a specimen measurement unit 51 and an inspection execution unit 52. The specimen measurement unit 51 and the inspection execution unit 52 each are implemented by, for example, a program.

The specimen measurement unit 51 executes the specimen measurement mode. The specimen measurement unit 51 monitors a change in the mass of the specimen while controlling the heating unit 3 and heating the specimen and stops the heating unit 3 when the mass change rate of the specimen becomes a predetermined threshold or less.

The specimen measurement unit 51 calculates a moisture content M of the specimen by using the mass measurement value of the specimen before heating and the mass measurement value after heating according to equation (1).

$$M(\%) = [[(W1-W2)]/W1] \times 100 \qquad (1)$$

(where W1 is the mass measurement value before heating, and W2 is the mass measurement value after heating.)

The inspection execution unit 52 executes the inspection mode. The inspection execution unit 52 includes a standard substance measurement unit 52a, an average moisture content calculation unit 52b, a standard deviation calculation unit 52c, and a state diagnosis unit 52d.

The standard substance measurement unit 52a measures the moisture content M a plurality of times by using a standard substance for inspection (hereinafter simply referred to as "standard substance") as a specimen.

The average moisture content calculation unit 52b calculates an average moisture content $M_{AVE}$ by averaging the measured moisture content of the standard substance which is obtained by measurement executed by the standard substance measurement unit 52a a plurality of times.

The standard deviation calculation unit 52c calculates a standard deviation σ of the measured moisture content of the standard substance which is obtained by measurement executed by the standard substance measurement unit 52a a plurality of times.

The state diagnosis unit 52d determines whether the average moisture content $M_{AVE}$ of the standard substance falls within a predetermined range with reference to a theoretical moisture content $M_T$ of the standard substance, thereby determining the presence/absence of an abnormality in the mass measurement unit 2.

The state diagnosis unit 52d also determines the presence/absence of an installation environment influence by evaluating the standard deviation σ calculated by the standard deviation calculation unit 52c.

The input unit 6 includes operation buttons such as a start button, a stop button, up/down buttons, a selection button, and a determination button and is used to issue instructions to start and stop measurement, set a mode, and select an operation, etc.

The display unit 7 is a liquid crystal display that displays measurement results, a mode selection screen, a message, etc. Note that the input unit 6 and the display unit 7 may be integrated into a touch panel display.

The storage unit 8 is, for example, a nonvolatile semiconductor memory such as a flash memory. The storage unit 8 stores a heating temperature setting and the amount of specimen placed for proper inspection in accordance with the theoretical moisture content of a standard substance and the standard substance.

Next, the standard substances used for state diagnosis of the moisture meter 100 will be described. As standard substances, for example, the substances illustrated in Table 1 can be used, but are not limited to these substances. Sodium tartrate is especially suitable because of its high stability and easy handling. With regard to these substances, appropriate heating temperatures for the measurement of the theoretical moisture content $M_T$ and the moisture content are known. That is, such a substance is known to exhibit the predetermined theoretical moisture content $M_T$ with an arbitrary mass when being heated at a predetermined temperature.

TABLE 1

Examples of Available Standard Substances

| Substance Name | Theoretical Moisture Content |
|---|---|
| Sodium tartrate dihydrate | 15.66% |
| Sodium citrate dihydrate | 12.4% |
| Sodium tungstate dihydrate | 10.92% |
| Calcium bromide dihydrate | 15.26% |
| Calcium chloride dihydrate | 32.41% |
| Sodium dihydrogen phosphate dihydrate | 20.23% |

Although at least one standard substance may be set, a plurality of standard substances may also be set. In this case, the storage unit 8 stores the theoretical moisture content of a plurality of standard substances, appropriate heating temperatures, and the amounts of specimens placed in correspondence with the codes respectively assigned to the individual substances.

Next, the operations of the moisture meter 100 in the specimen measurement mode and the inspection mode will be described.

Specimen Measurement Mode

Figure 3:
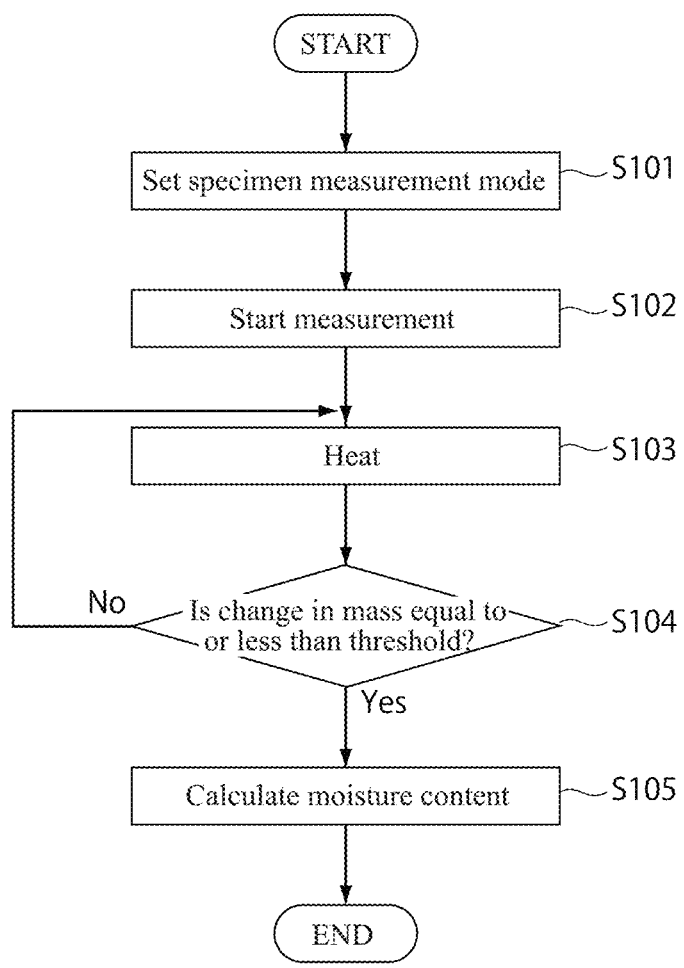
FIG. 3 is a flowchart for an operation in the specimen measurement mode of the same moisture meter.

FIG. 3 is a flowchart for the operation of the moisture meter 100 in a normal usage state, that is, in the specimen measurement mode of the moisture meter 100.

When measuring a specimen, a user sets the moisture meter 100 in the specimen measurement mode via the input unit 6 in step S101. When the specimen measurement mode is set in advance as the normally used mode, step S101 may be omitted.

Next, in step S102, the user places the specimen on the weighing dish 2a, closes the lid 9, sets a heating temperature via the input unit 6, and presses the measurement start button.

Next, in step S103, the specimen measurement unit 51 starts heating the heating unit 3. The heating gradually evaporates the moisture of the specimen, and the mass measurement value of the specimen measured by the mass measurement unit 2 gradually decreases with the elapse of time.

The specimen measurement unit 51 monitors a change in this mass measurement value. In step S104, when the change in mass measurement value becomes equal to or less than a predetermined threshold (Yes), the process shifts to step S105. In step S105, the specimen measurement unit 51 stops heating by the heating unit 3, calculates the moisture content M according to equation (1), and terminates the measurement upon displaying the calculation result on the display unit 7.

Inspection Mode

Figure 4:
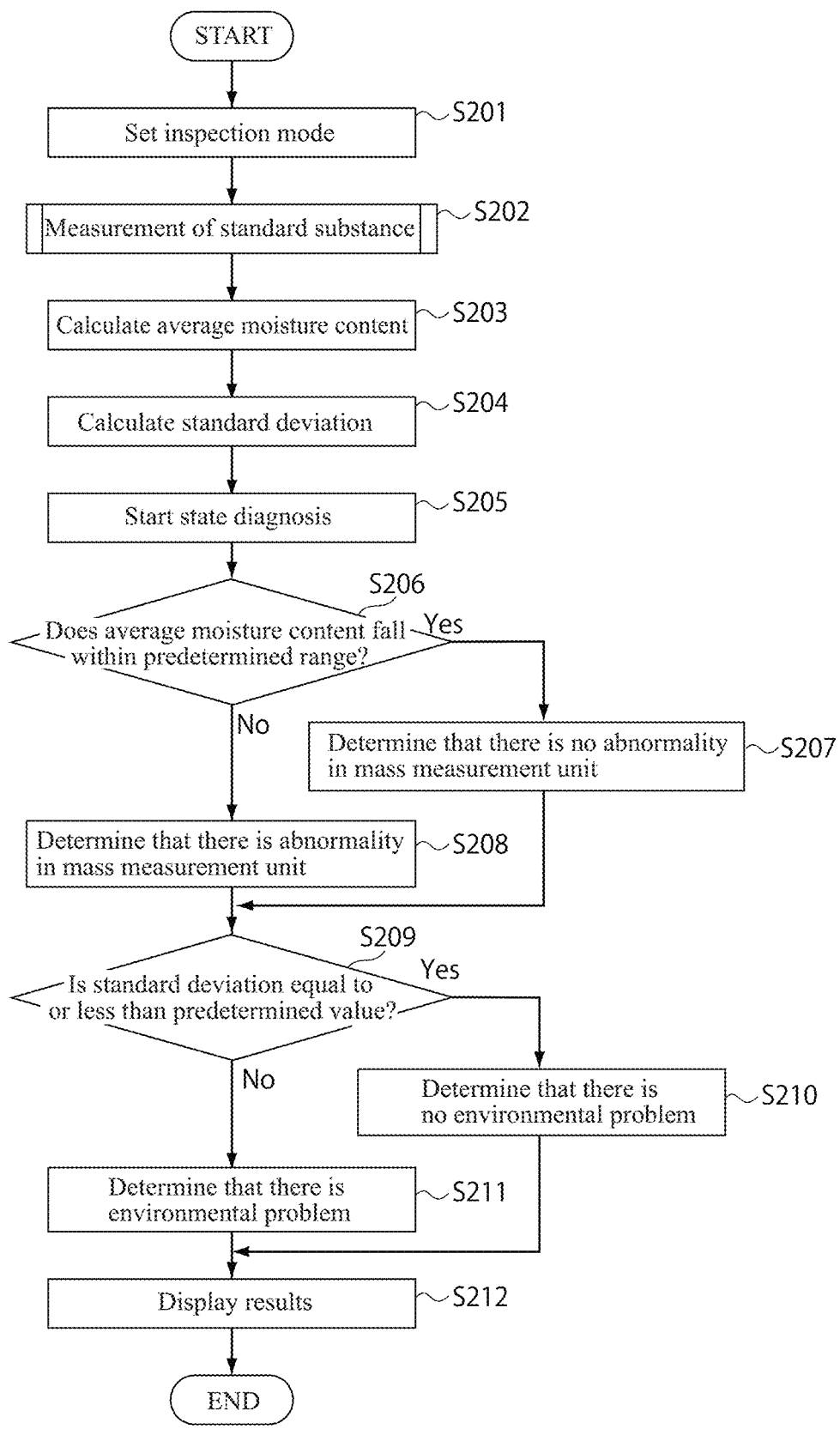
FIG. 4 is a flowchart for an operation in the inspection mode of the same moisture meter.

FIG. 4 is a flowchart for explaining the operation of the moisture meter 100 in the inspection mode. The user of the moisture meter 100 can execute the inspection mode at an arbitrary time when he/she wants to inspect the presence/absence of an abnormality in the moisture meter 100. Assume that in the following description, sodium tartrate is used as a standard substance, and the standard substance is measured N times.

In step S201, the user sets the inspection mode via the input unit 6. In step S202, the standard substance measurement unit 52a measures the moisture content of the standard substance as a specimen N times. In this case, N may be a natural number equal to or more than 2. However, from the viewpoint of calculating a standard deviation, N is preferably 3 or more.

Figure 5:
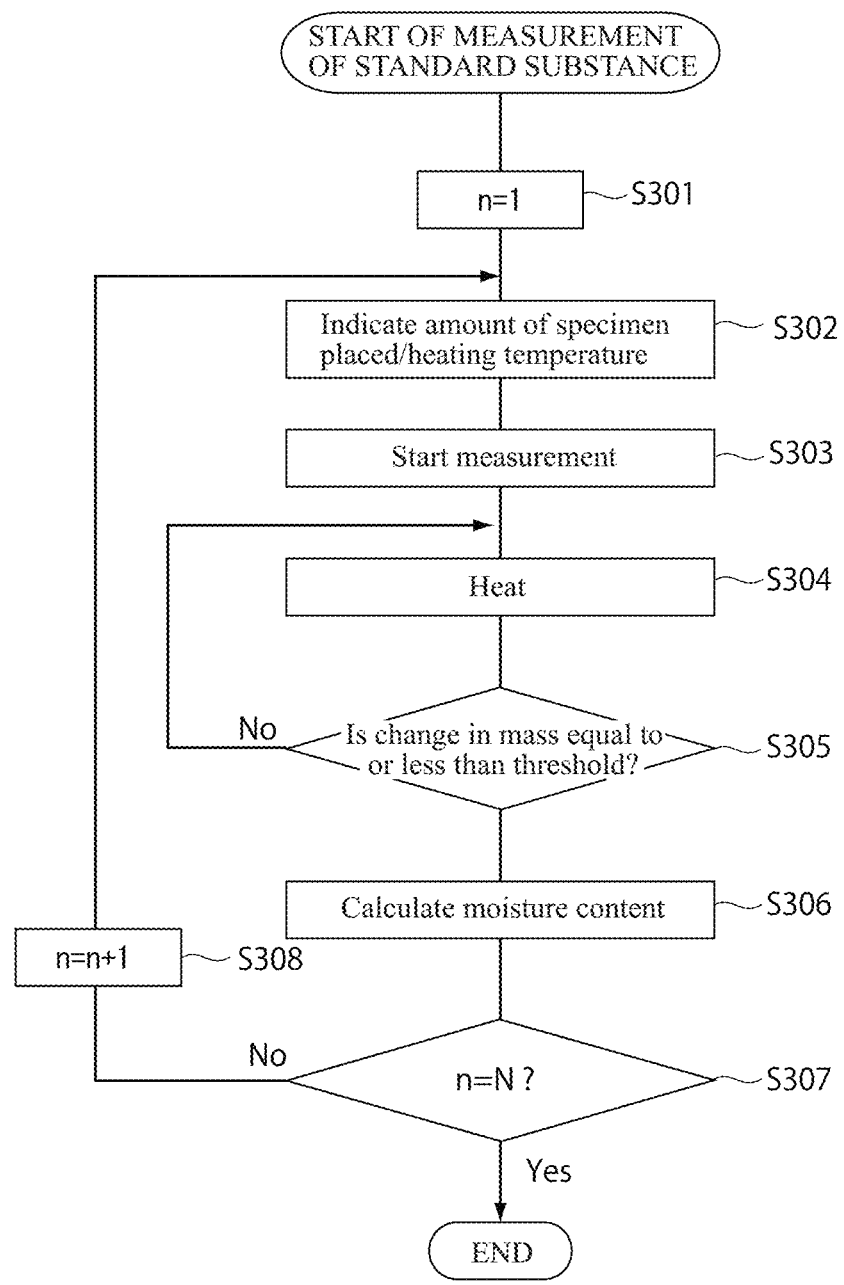
FIG. 5 is a flowchart for an operation in standard substance measurement by the same moisture meter.

A detailed operation of measurement of the standard substance in step S202 will be described with reference to FIG. 5. When the measurement of the standard substance starts, the standard substance measurement unit 52a sets a counter for counting measurement count n to n=1 in step S301.

Next, in step S302, the standard substance measurement unit 52a displays the amount of specimen to be placed and the heating temperature setting appropriate for inspection, stored in advance in the storage unit 8 in correspondence with sodium tartrate, on the display unit 7 as, for example, the following message:

"Standard Substance: Sodium tartrate
(a) Heating temperature setting: 160° C.
(b) Specimen mass: about 5 g"

Next, in step S303, the user places about 5 g of sodium tartrate on the weighing dish 2a based on an instruction on the display unit 7, and closes the lid 9, and starts measurement upon setting the heating temperature setting to 160° C.

A heating temperature may be manually set by the user or may be automatically set to a heating temperature to be handled by the moisture meter 100 in accordance with the type of standard substances.

Next, in step S304, the standard substance measurement unit 52a starts heating the heating unit 3. The standard substance measurement unit 52a monitors a change in the mass measurement value of the mass measurement unit 2 as in the specimen measurement mode.

When the change in mass measurement value becomes not more than a predetermined threshold in step S305, the standard substance measurement unit 52a stops heating by the heating unit 3 and calculates the moisture content M of the standard substance according to equation (1) in step S306. The calculation result is temporarily stored in the storage unit 8.

Next, in step S307, the standard substance measurement unit 52a determines whether n=N, that is, whether the current measurement is the Nth measurement.

When n≠N (No in this case), the standard substance measurement unit 52a increments the counter to n=n+1 in step S308, and the process returns to step S302. The standard substance measurement unit 52a repeats steps S302 to S307 until n=N. When n=N in step S307 (Yes), the standard substance measurement unit 52a terminates the measurement of the standard substance, and the process shifts to step S203 in FIG. 4.

In step S203, the average moisture content calculation unit 52b calculates the average moisture content $M_{AVE}$ by averaging the measured moisture content of the standard substance measured N times in step S202.

Next, in step S204, the standard deviation calculation unit 52c calculates the standard deviation σ of the measured moisture content from the measured moisture content of the standard substance measured N times in step S202.

Next, in step S205, the state diagnosis unit 52d starts state diagnosis. In step S206, the state diagnosis unit 52d determines whether the average moisture content $M_{AVE}$ calculated in step S203 falls within a predetermined range with reference to the theoretical moisture content $M_T$.

When, for example, sodium tartrate is used as in this case, the state diagnosis unit 52d determines whether the moisture content falls within the range of 15.0 to 16.0.

A predetermined range with reference to the theoretical moisture content $M_T$ is set in accordance with the type of standard substances. For example, a predetermined range such as "within theoretical moisture content $M_T$ of ±1%" may be set.

When the average moisture content $M_{AVE}$ falls within the predetermined range in step S206 (Yes), the state diagnosis unit 52d determines in step S207 that there is no abnormality in the mass measurement unit 2.

In contrast to this, when the average moisture content $M_{AVE}$ falls outside the predetermined range in step S206 (No), the state diagnosis unit 52d determines in step S208 that there is an abnormality in the mass measurement unit 2.

Next, in step S209, the state diagnosis unit 52d determines whether the standard deviation σ of the measured moisture content measured N times, which is calculated in step S204, is not more than a predetermined value set in advance, for example, 0.05% or less.

When the standard deviation σ is not more than the predetermined value set in advance in step S209 (Yes), the state diagnosis unit 52d determines in step S210 that there is no problem in the installation environment.

On the other hand, when the standard deviation is larger than the predetermined value set in advance in step S209 (No), the state diagnosis unit 52d determines in step S211 that there is a problem in the installation environment.

Next, in step S212, the state diagnosis unit 52d displays the diagnosis results on the display unit 7 and terminates the processing.

FIGS. 6 and 7 illustrate display examples of diagnosis results displayed on the display unit 7. On each display, the button (highlighted in gray in FIGS. 6 and 7) on the image which is indicated by a black arrowhead 7a is the currently selected button. By selecting this button, a display screen is transitioned.

Figure 6A:
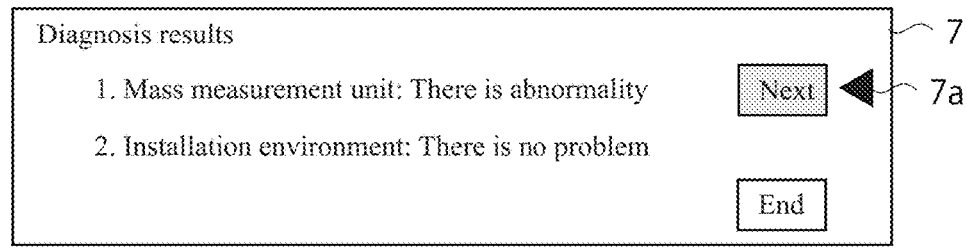
Figures 1, 6B:
Figures 2, 6B:
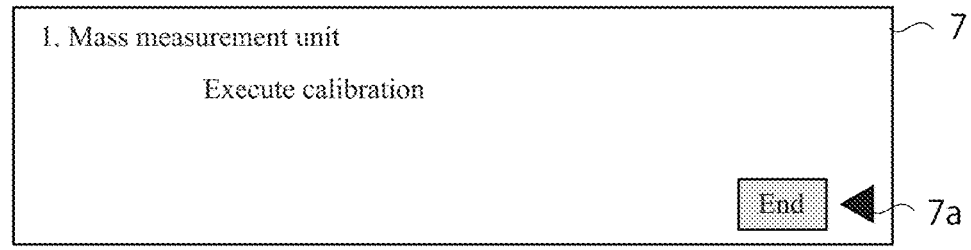
Figures 1, 6C:
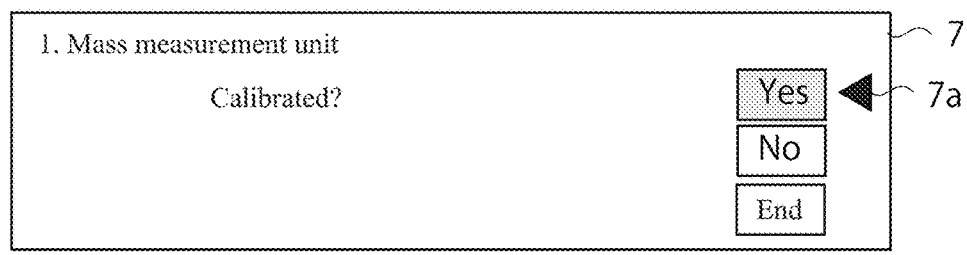
Figures 2, 6C:
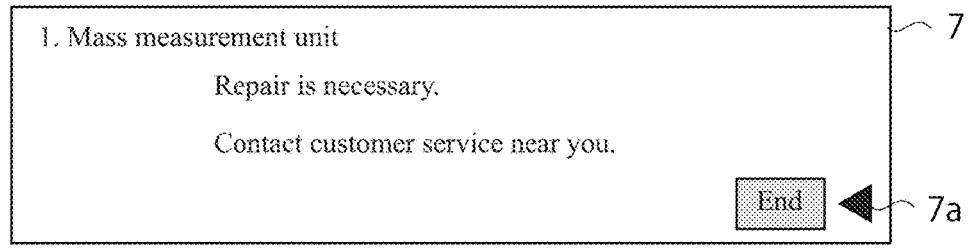

FIG. 6(A) is an example of display when it is determined in step S206 that there is an abnormality in the mass measurement unit 2, and it is determined in step S209 that there is no problem in the installation environment. When the user selects "Next" in the state of FIG. 6(A), the state diagnosis unit 52d displays, on the display unit 7, a message for confirming whether calibration has been performed as illustrated in FIG. 6(B-1).

When no calibration has been performed, the user selects "No." The state diagnosis unit 52d then determines that calibration is necessary and displays a message prompting execution of calibration on the display unit 7 as illustrated in FIG. 6(B-2). Upon confirmation of this message, the user executes calibration and selects the end button. Alternatively, the moisture meter 100 may be configured to automatically execute calibration.

Upon executing the calibration, the user executes measurement in the inspection mode again to check whether the abnormality has been eliminated. If the abnormality has not been eliminated even after the execution of calibration, the user selects "Yes" as illustrated in FIG. 6(C-1).

The state diagnosis unit 52d then determines that the abnormality in the mass measurement unit 2 has not been eliminated even after the execution of calibration and the moisture meter 100 needs to be repaired and displays a message prompting repair as illustrated in FIG. 6(C-2). The user requests repair in accordance with the message.

Figure 7A:
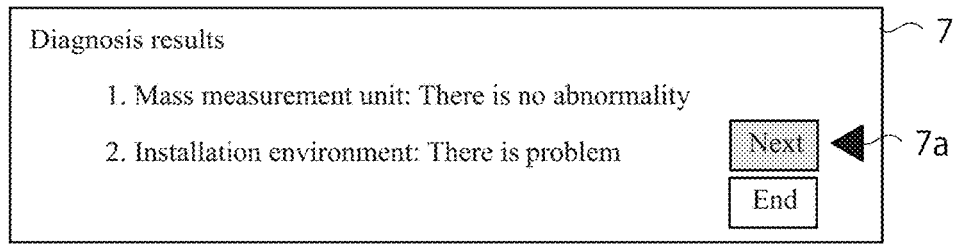
Figure 7B:
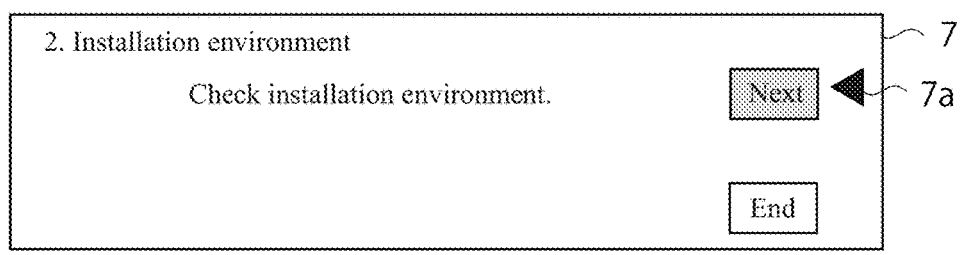
Figures 1, 7C:
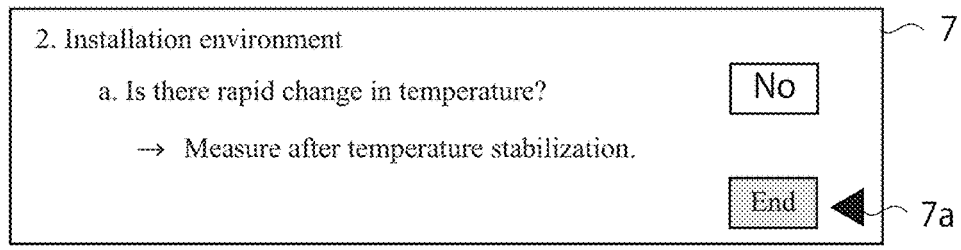
Figures 2, 7C:
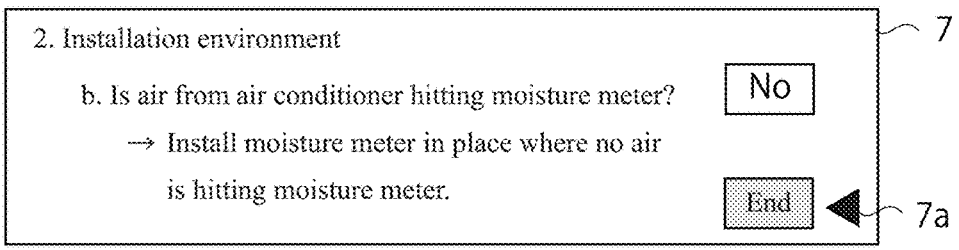
Figures 3, 7C:
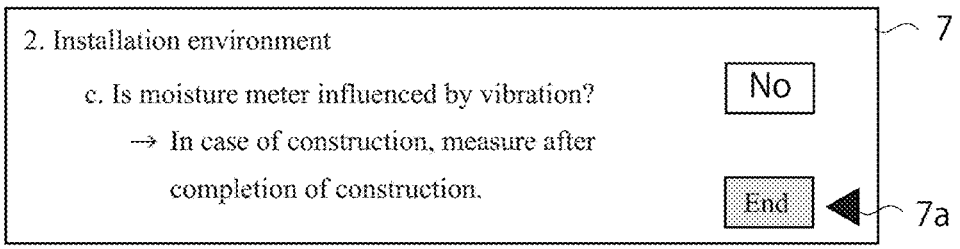

FIG. 7(A) is an example of display when it is determined in step S206 that there is no abnormality in the mass measurement unit 2, and it is determined in step S209 that there is a problem in the installation environment. When the user selects "Next" in the state of FIG. 7(A), the state diagnosis unit 52d displays a message prompting a check of the installation environment on the display unit 7, as illustrated in FIG. 7(B).

In this case, when the user selects "Next," the state diagnosis unit 52d displays a message indicating the state of an environment that may have an influence on the moisture meter and countermeasures corresponding to the state, as illustrated in FIG. 7(C-1).

When the user considers that the current state is applicable to the state indicated by the message, he/she selects "End" and takes corresponding measures in accordance with the message. When the user considers that the current state is not applicable to the state indicated by the message, he/she selects "No" to display a message indicating a next conceivable state and countermeasures corresponding to the state, as illustrated in FIG. 7(C-2). The same applies to FIG. 7(C-3).

Sequentially displaying the state of an installation environment as a cause of abnormality and corresponding countermeasures as messages in this manner allows even an unskilled user to take necessary measures by simply following the display.

A conventional moisture meter requires the following configuration when determining the influence of disturbances on a failure in the moisture meter. For example, it is necessary for the moisture meter to include sensors that directly detect disturbances, such as a temperature sensor, a humidity sensor, a vibration sensor, and an atmospheric sensor. Alternatively, as disclosed in Patent Literature 2, it is necessary for a moisture meter to include a built-in weight capable of automatically moving up and down and calculate the standard deviation of measured moisture content by measuring the built-in weight a plurality of times.

A standard substance such as sodium tartrate exhibits a predetermined moisture content with an arbitrary mass when being heated at a predetermined temperature. The moisture meter 100 according to this embodiment is configured to evaluate the influence of an environment by, making use of the above-described characteristics, using the standard deviation of measured moisture content obtained by measuring the standard substance as a specimen a plurality of times, to produce the same effects when using the standard deviation of weighed values. The above configuration makes it possible to provide a moisture meter that can consider the influence of an environment with a simple configuration without any environment sensors such as a humidity sensor, a vibration sensor, and an atmospheric sensor or any built-in weight.

In addition, this embodiment is configured to measure a standard substance a plurality of times, compare the average moisture content obtained by averaging the measured moisture content obtained by measurement a plurality of times with the theoretical moisture content of the standard substance stored in the storage unit, and diagnosis the presence/absence of an abnormality in the mass measurement unit. This makes it possible to diagnose the presence/absence of an abnormality in the mass measurement unit by using values with higher accuracy than in the prior art, thereby improving the accuracy of diagnosis.

The moisture meter according to this embodiment is configured to display, on the display unit, information indicating whether the cause of an abnormality has originated from the mass measurement unit or the installation environment and to display a message notifying the user of countermeasures corresponding to the cause. The above configuration allows an even unskilled user to easily take appropriate measures corresponding to the cause of the abnormality, thus providing user-friendly services.

Although the preferred embodiments of the present invention have been described, the above embodiments are examples of the present invention. These embodiments can be combined based on the knowledge of a person skilled in the art. Such combined embodiments are also incorporated in the scope of the present invention.

REFERENCE SIGNS LIST

2: Mass measurement unit
2a: Weighing dish
3: Heating unit
5: Control arithmetic unit
7: Display unit
8: Storage unit
52a: Standard substance measurement unit
52b: Average moisture content calculation unit
52c: Standard deviation calculation unit
52d: State diagnosis unit
100: Moisture meter

The invention claimed is:

1. A moisture meter comprising:
a mass scale configured to measure a mass of a specimen placed on a weighing dish;
a heater configured to heat the specimen;
a processor configured to control the heater to heat the specimen until a change in mass of the specimen becomes not more than a predetermined threshold and calculate a moisture content of the specimen from the change in the mass of the specimen before and after heating; and
a storage unit,
wherein the processor causes the moisture meter by executing program instructions to execute a measurement of a moisture content a plurality of times by using a different specimen for each of the plurality of times of an arbitrary mass of a standard substance for inspection having a predetermined theoretical moisture content when being heated at a predetermined temperature, and
wherein the processor causes the moisture meter to calculate a standard deviation of a measured moisture content in the measurement executed the plurality of times, and to evaluate the presence or absence of an abnormality in a mass measurement unit by comparing an average of the measured moisture contents with a theoretical moisture content of the standard substance stored in the storage unit, and to evaluate whether an installation environment is causing abnormalities in the measurements taken without a need for a built-in weight by determining whether the standard deviation is not more than a predetermined value, and
wherein the standard substance is a salt having bonded water of crystallization that splits off at a threshold temperature.

2. The moisture meter according to claim 1, wherein the standard substance is sodium tartrate dihydrate.

3. The moisture meter according to claim 2, comprising a display unit,
wherein the processor causes the moisture meter to display, on the display unit, as diagnosis results, information indicating whether a cause of an abnormality has originated from the mass measurement unit or the installation environment and displays a message notifying a user of a countermeasure corresponding to the cause.

4. The moisture meter according to claim 1, comprising a display unit,
wherein the processor causes the moisture meter to display, on the display unit, as diagnosis results, information indicating whether a cause of an abnormality has originated from the mass measurement unit or the installation environment and displays a message notifying a user of a countermeasure corresponding to the cause.

5. A state diagnosis method for a moisture meter including a mass scale to measure a mass of a specimen placed on a weighing dish, a heater configured to heat the specimen, a processor configured to control the heater to heat the specimen until a change in mass of the specimen becomes not more than a predetermined threshold and calculate a moisture content of the specimen from the change in the mass of the specimen before and after heating, and a storage unit, the method comprising the steps of:

(a) the processor causing the moisture meter to execute a measurement of a moisture content a plurality of times by using a different specimen for each of the plurality of times of an arbitrary mass of a standard substance for inspection having a predetermined theoretical moisture content when being heated at a predetermined temperature;

(b) the processor causing the moisture meter to calculate a standard deviation of a measured moisture content in the measurement executed the plurality of times;

(c) the processor causing the moisture meter to evaluate the presence/absence of an abnormality in a mass measurement unit by comparing an average of the measured moisture content with a theoretical moisture content of the standard substance stored in the storage unit; and (d) the processor causes the moisture meter to evaluate whether an installation environment is causing abnormalities in the measurements taken without a need for a built-in weight by determining whether the standard deviation is not more than a predetermined value, wherein the standard substance is a salt having bonded water of crystallization that splits off at a threshold temperature.

6. A non-transitory computer readable storage medium comprising a program for causing the moisture meter to execute the method according to claim 5.

* * * * *